(12) United States Patent
Perseval et al.

(10) Patent No.: US 8,258,650 B2
(45) Date of Patent: Sep. 4, 2012

(54) ELECTRIC CIRCUIT FOR AUTOMOBILE

(75) Inventors: Herve Perseval, Marcoussis (FR); Bernard Boucly, Le Chesnay (FR)

(73) Assignee: Peugeot Citroen Automobiles SA (FR)

( * ) Notice: Subject to any disclaimer, the term of this patent is extended or adjusted under 35 U.S.C. 154(b) by 217 days.

(21) Appl. No.: 12/745,506

(22) PCT Filed: Dec. 2, 2008

(86) PCT No.: PCT/FR2008/052185
§ 371 (c)(1),
(2), (4) Date: May 28, 2010

(87) PCT Pub. No.: WO2009/077703
PCT Pub. Date: Jun. 25, 2009

(65) Prior Publication Data
US 2010/0308650 A1     Dec. 9, 2010

(30) Foreign Application Priority Data
Dec. 3, 2007   (FR) ...................................... 07 59532

(51) Int. Cl.
*F02P 9/00* (2006.01)
*H02J 1/00* (2006.01)
(52) U.S. Cl. ...................................... 307/10.6; 903/907
(58) Field of Classification Search ................ 307/10.6; 903/907
See application file for complete search history.

(56) References Cited

U.S. PATENT DOCUMENTS

| | | | |
|---|---|---|---|
| 6,919,648 B2 * | 7/2005 | Bolz et al. | 290/40 C |
| 7,367,302 B2 * | 5/2008 | Bolz et al. | 123/179.3 |
| 2004/0112320 A1 | 6/2004 | Bolz et al. | |
| 2006/0048733 A1 | 3/2006 | Bolz et al. | |

FOREIGN PATENT DOCUMENTS

| | | |
|---|---|---|
| FR | 2853154 A1 | 10/2004 |
| WO | 02/066293 A1 | 8/2002 |
| WO | 2004/034543 A1 | 4/2004 |

OTHER PUBLICATIONS

International Search Report from corresponding International Application No. PCT/FR2008/052185 dated Sep. 11, 2009.

* cited by examiner

*Primary Examiner* — Hal Kaplan
(74) *Attorney, Agent, or Firm* — Polster, Lieder, Woodruff & Lucchesi, L.C.

(57) ABSTRACT

The invention relates to an electric circuit for an automobile, that comprises a ground line (M), an onboard network (R) with a battery (1) connected to the network (R) and to the ground (M) by a branch (b1) comprising a switch (K1) and by a second branch (b2) including a switch (K2), an alternator (3) connected to the battery, a starter and consumer members (4) connected to said onboard network and to the ground. The circuit further includes a voltage holding device that comprises a bridge (b3) connecting the branch (b1) to the branch (b2) and a capacitor (2) connected to the bridge (b3) at a location between the third switch (K2) and the second branch (b2), and an internal supply device (8) that allows the current flow in the second branch (b2) only when recharging the capacitor (2).

9 Claims, 2 Drawing Sheets

ELECTRIC CIRCUIT FOR AUTOMOBILE

CROSS-REFERENCE TO RELATED APPLICATIONS

This application is the US national stage under 35 U.S.C. §371 of International Application No. PCT/FR2008/052185 (published as WO 2009/077703) which claims the priority to French patent application 0759532 filed Dec. 3, 2007 where the content (text, drawings and claims) of both is incorporated here by reference.

TECHNICAL DOMAIN

This invention concerns the onboard networks for automotive vehicles, and more especially, the onboard networks for vehicles equipped with a reversible electric machine of the starter alternator type that, at the time of a start up of the engine, constitutes an electric energy consuming device, and that outside of this start up period, can function in a current generator mode. The invention especially applies to the onboard networks equipped with a relatively powerful starter alternator, as required by a STOP-AND-START function and/or for the start up of the engines of relatively large capacities.

BACKGROUND

Some automotive vehicles are equipped with starter alternators, that is to say an electric machine capable of starting the engine by using an electric source such as a battery or generating an electric current stored in the battery when the vehicle is driven by the engine. These machines can be used specifically in the vehicles equipped with a "STOP & START" function for which the engine stops as soon as the vehicle is at a stop, and starts again for example as soon as the driver accelerates again. More precisely, on these vehicles, the STOP & START function can be decomposed into three phases:

The initial start up phase of the engine—on a spark ignition engine ("gasoline" motor) or compression ignition engine ("diesel" motor). This initial phase is stilled called first start up phase.

The driving phase of the vehicle with the engine turning, generating zero acceleration from the vehicle (maintenance of the speed), positive acceleration or negative acceleration (i.e., deceleration). At the time of the deceleration situations, the STOP & START system can be designed to transform a part of the vehicle's kinetic energy into electrical energy, electrical energy that may be used by the set of consumer devices of the vehicle's onboard network or stored for example by means of the battery. In addition, the STOP & START system cuts the power of the engine as soon as the vehicle is at a stop, or even as soon as a stop is anticipated, for example as soon as the speed of the vehicle falls below a certain low speed threshold, which permits reducing the fuel consumption and therefore limiting the emission of pollutants.

The restart phase of the engine, ordered by the driver's command, marked for example by the depression of the accelerator pedal.

The electrical machines of starter alternator type that permit the restarting of the motor have high energy requirements. At the time of the first start up, most electric consumers of the vehicle are normally at a stop. Such is not the case at the time of restarting of the engine, at which time equipment such as the air conditioner, the lighting system, the audiovisual system of the vehicle, etc. may be active, and remain so for the comfort and the safety of the vehicle's occupants.

However the electric machine dedicated to the restarting has a high current consumption that can generate high voltage drops on the whole of the onboard network and damage some components requiring electrical energy, resulting in a poor perception of the quality of the whole vehicle, with a failure rate that is sensed as random because the vehicle user does not necessarily associate the restarting of the vehicle motor with this fault (especially since the driver has not explicitly ordered the stopping of the motor).

In order to remedy this problem, different solutions have been proposed. The simplest, which is already implemented on commercial vehicles having the STOP-&-START function, consists in increasing the available electric power by coupling a second battery to the main battery. The main battery serves to supply the necessary electric power at the time of the first start up and restarting phases. At the time of this restarting, the electric functions sensitive to voltage variations are fed by a second battery—that is then the unique source of power for these functions at the time of this phase. Outside of this restarting phase (the duration of which is typically less than 1 sec), these sensitive functions are fed by the vehicle generator (for example the alternator).

This solution not only has a relatively high cost because of the additional battery—since the main battery must generally be replaced for example every two/three years but also because this additional battery cannot always be installed in the motor compartment and must be housed for example in the trunk, hence a need to reformulate the entire electrical architecture of the vehicle or even the entire structure of the vehicle. In addition, the mass of this additional battery and the electric bundles dedicated to it load down the vehicle goes contrary to meeting one of the objectives of this type of system, namely the reduction of fuel consumption and polluting emissions. Finally, this additional battery is generally dedicated to the consumer devices most sensitive to the voltage drops; therefore it does not necessarily constitute a complete solution to the problem of deterioration of the electric services, some equipment not supplied by this additional battery may see their performance decreased. This problem is aggravated by the multiplicity of accessories planned to be connected to an onboard network, such as for example the games consoles, video consoles, refrigerator, bottle warmer, etc., so that it is not always easy to ensure an appropriate sizing of the equipment, except by significantly over-dimensioning.

Another possibility consists in proposing to complete the battery by another type of energy storage means, such as for example a capacitor. The battery then supplies the necessary electric power to start the engine (first start up phase) of the vehicle and serves to supply the set of functions connected to it. The secondary means of storage is essentially used at the time of the restarting. But as the reference voltage of this secondary means of storage is variable, for example between one to three times the reference voltage value of the vehicle, this secondary means of storage cannot be connected to the onboard network if one foresees a DC/DC or analog type converter. There this solution still entails a significant surcharge, of the installation problems (the converter can require a volume of the order of 5 L for example) and increase the total mass of the vehicle (by the order for example of 5 to 10 kg).

More recently, some vehicles have been provided with a voltage maintenance device, still known under the (French) abbreviation DMT, mounted in series with the battery. The DMT is in fact an instantaneous power DC/DC compensator voltage converter, through which the under-voltage sensitive devices are fed at least at the time of the restarting phases, the DMT then takes its energy from the battery. This solution in fact poses similar problems to the solution consisting of splitting the battery, therefore making the electric architecture of the vehicle more complex, causing an increase of the vehicle mass, a loss of volume due to the footprint of the DMT and a reduction of the performance for the devices not supplied by this converter.

Furthermore, a supply system in electric energy is known from patent FR2853154 of consumer devices loaded onboard an automotive vehicle including the means of forming electric energy by a generator where the output is connected via an electrical network to a first means of electrical energy storage—such for example an electro-chemical battery—and to a first consumer device. A second consumer device is connected to the electric network via a means of forming a source of auxiliary energy, such as for example a capacitor, and the means of switching the operation which is controlled by means of a command to permit charging the second means of storage in series with the rest of the system and a connection of these with the second consumer device to ensure its supply at the time of its activation. Such a device permits increasing the voltage and power at the terminals of the second consumer device at the time of its activation, and therefore permits attenuating the drops in voltage associated with the start up of large energy consumer devices, without thereby over-dimensioning the means of energy generation and storage. Insofar as this device has the sole purpose of supplying instantaneous power to a function it does not afford any solutions at the time of the motor stop phases.

BRIEF DESCRIPTION OF THE INVENTION

This invention thus has as its goal a network architecture including a starter alternator and a capacitor permitting minimizing the voltage drops when the starter alternator is in starter mode.

According to the invention, this goal is achieved by an electrical circuit including a grounding line, an onboard network with a battery attached to the onboard network and connected to the grounding line by a first branch including a first switch and by a second branch including a second switch, a generator connected to the battery, a starter and the consumer devices connected to the on board network and to the ground line. The circuit includes a voltage maintenance device formed by a bridge connecting a point of the first branch between the battery and the first switch to a point of the second branch between the second switch and the grounding line and a capacitor connected to the bridge at a point between the third switch and the second branch and an internal supply device authorizing the passage of the current in the second branch only at the time of recharging the capacitor.

This invention especially applies to electric circuits including a starter alternator.

With the network architecture proposed according to the invention, voltage can be maintained specifically at the time of the start up; i.e., when the starter alternator operates in starter mode, and therefore constitute a significant load for the network, so that the other electrical consumer devices are not perturbed by the voltage drop normally generated by the activation of the start up function.

This goal is attained by the simple use of switches and an internal supply device that can certainly be the DC/DC converter type but nevertheless . . . , therefore without the cost (both financial and footprint) compared to that of the converters recommended by the prior art.

The circuit according to the invention can be obtained from a conventional circuit to which are added a certain number of elements (in practice the second branch, the bridge, the internal supply unit, the capacitor and some switches), but the electrical architecture of the vehicle remains unmodified as a whole, in other words the invention is particularly simple to implement in the case where the STOP-AND-START function is designed as an option, because the conventional circuit of the vehicle does not have to be redefined.

In a preferred variant, the circuit is designed in a manner such that the first branch connects the negative pole of the battery to ground.

In one variant, the internal supply device includes a diode and an inductance winding. It can also involve another type of DC/DC converter (characteristics . . . ), specifically a step down type converter.

The converter can in fact be constituted by the association in series of a plurality of capacitors. This or these capacitor(s) are otherwise advantageously super-capacitors, further known under the term of ultra-capacitors or UCAP where the energy storage technology by supercapacitors relies on the same operating principle as classic capacitors, and thus affords the performances at lower energy densities than an electro-chemical battery but with a storage/discharge capacity at high powers. The supercapacitors withstand a much greater number of charge and discharge cycles than the conventional batteries, specializing in the applications requiring sources of high power over short times. The supercapacitors currently marketed are constituted typically by a cylindrical element formed by the winding on itself on a leaf composed of a leaf of aluminum forming an anode, with a separator made of paper and another leaf of aluminum forming a cathode. The leaves forming the anode and the cathode typically undergo a surface treatment to encourage the formation of a fine layer of alumina and especially the adherence of an active layer, such as for example a carbon foam material. The element thus formed is then impregnated with an electrolyte and the whole is locked into an insulated case in order to avoid evaporation of the electrolyte while foreseeing, of course, the means to connect the anode and the cathode in an electric circuit.

In one variant of the invention, the switches are advantageously managed by a control unit commanding the switching according to the operating mode of the starter alternator. By preference, this management is also going to take into account external parameters such as the speed of the vehicle, the engine regime, the charge level of the capacitor, the charge level of the battery and the load level of the onboard network.

BRIEF DESCRIPTION OF THE FIGURES

Other advantages and particularities of the invention will come out from the description below of embodiment modes made in reference to the attached drawings in which.

DETAILED STATEMENT OF EMBODIMENT MODES OF THE INVENTION

Figure 1:
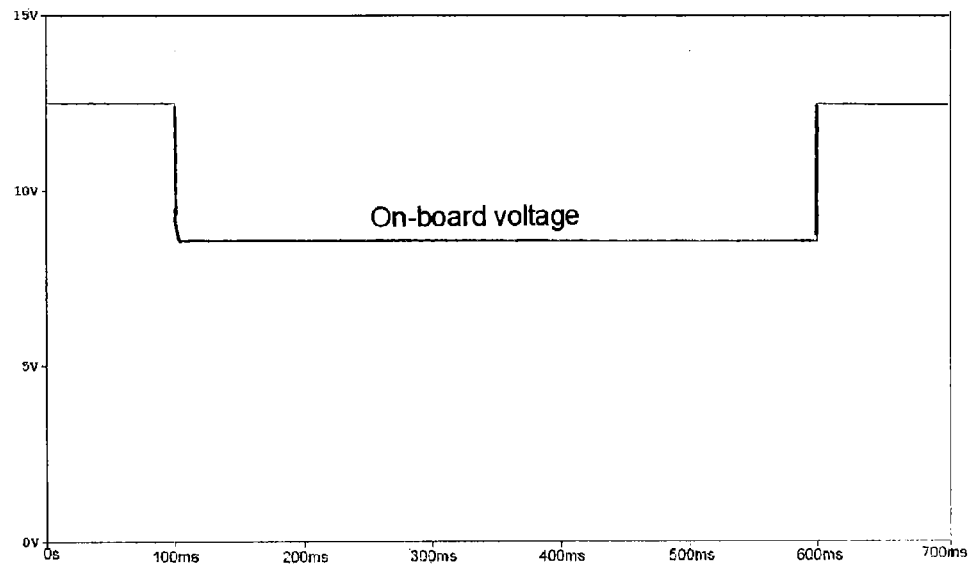
FIG. 1 is a diagram illustrating the voltage drop of the onboard network at the time of a start up if no compensation process is foreseen.

FIG. 1 is a simulation showing the variation of the onboard network voltage at the time of restarting on a vehicle equipped with a STOP-AND-START type restarting function. We may note that during a period of about 500 msec, the voltage of the onboard network, which normally is of the order of 12.5 Volt (in the hypothesis of a vehicle equipped with a conventional battery of a same voltage), drops in an almost instantaneous fashion to about 8 Volts.

Figure 2:
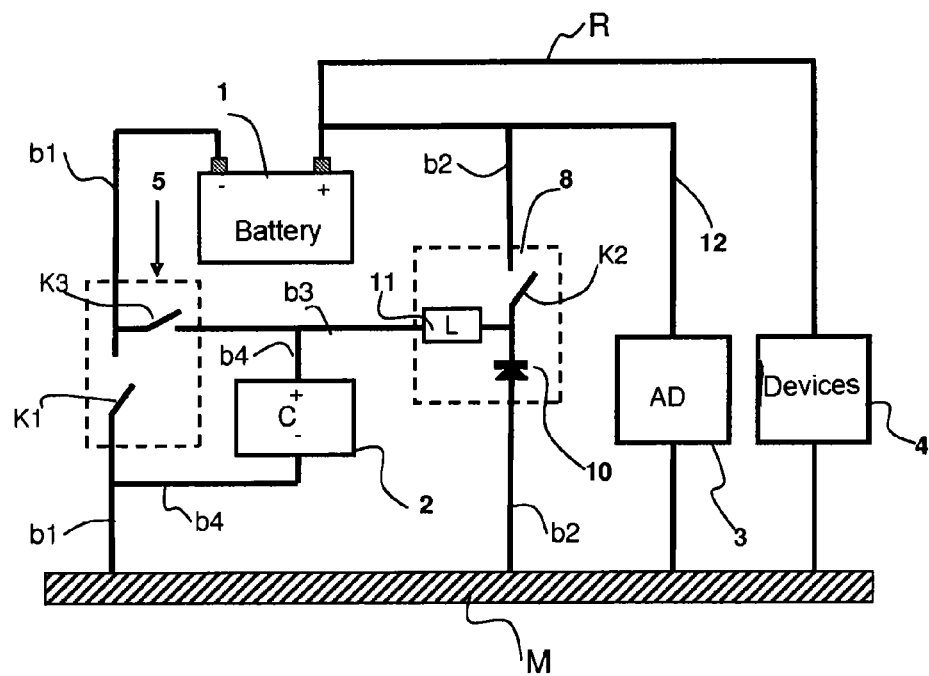
FIG. 2 is a simplified diagram of the electric circuit of an automotive vehicle provided with a centralized voltage maintenance device according to the invention.

To avoid such a voltage drop, this invention proposes to modify the electric circuit of the vehicle by adding a voltage maintenance device to it. The voltage maintenance device can be called centralized in the sense that it is not dedicated to one (or some) specific consumer devices 4. This device is illustrated in FIG. 2. It should be emphasized that this device is situated entirely within the environment close to the battery, and that its installation only requires relatively simple modifications to the electric circuit of the vehicle.

On this FIG. 2, the elements are found of a conventional circuit, namely an onboard network R, with a main supply constituted by a battery 1, specifically for example an electrochemical battery or generally any equivalent means of voltage accumulation.

The battery is fed by a starter alternator 3, connected to the battery by a branch 12 and otherwise connected to ground M. This starter alternator 3 is a reversible electric machine that plays a role of generator and therefore of electric energy generator (outside of the start up) and that at the time of the start up (for example the first start up or the restarts), drives the shaft of the engine. In one variant of the invention not represented here, an alternator is substituted for the starter alternator, the start up and the restarts are then assured by a starter that then constitutes an electrical load.

All these devices, as well as the starter alternator are connected on the one hand to the voltage Ur of the onboard network (for example 12.5 Volt) and on the other hand to a ground potential M. The battery is also connected to this ground potential by the branch b1 of the network, connected to the negative pole of the battery, and a branch b2 connected to the positive pole.

The voltage maintenance device according to the invention is essentially constituted by the insertion of a bridge b3 linking the two branches b1 and b2, a capacitor 2 is placed on a line b4 joining this bridge b3 to the branch b1. Two control switches K1 and K3 are respectively mounted on the branch b1 and the bridge b3. The switch K1 is placed more precisely on the part of the branch b1 between the bridge b3 and the branch b4, and the switch K3 is placed on the part of the bridge b3 between the branch b1 and the branch b4 carrying the capacitor. The switches K1 and K3 are controlled by means of a controller, here generally represented by reference 5, and controlled for example by the control motor—or more precisely the module dedicated to the start up and restarting of the vehicle.

When the switch K3 is in a pass through (or closed) position, then the switch K1 is in open position, and the capacitor is placed in series with the vehicle battery. This configuration corresponds to the start up or restart phase of the engine.

On the branch b2 there is also an assembly 8 forming an internal supply device, including a diode 10 and a inductance coil 11, associated with a switch K2, also controlled by the device 5 for example or by a device dedicated to this switch. In a variant, the diode 10 can be replaced by a switch, which causes the BUCK type structure to evolve towards a BUCK-BOOST type structure. The assembly 8 is analyzed therefore from an electrical point of view possibly as a DC/DC reversible converter.

For the capacitor recharging through the assembly 8, the switch K2 is controlled (possibly by frequency), switch K3 is open and switch K1 is pass-through.

More precisely, the charge voltage of the capacitor is obtained by the internal supply device 8. Advantageously, this charge voltage can be adjusted according to the electrical features of the starter alternator, the requirement of the vehicle's electrical functions/devices and the state of health of the battery (drained voltage, internal impedance and temperature).

Thus, the recharging of the capacitor may be controlled at the time of deceleration of the vehicle or motor corresponding to a kinetic energy recovery phase in electrical energy. This recharge may also be carried out under rolling conditions such that the vehicle speed is stabilized or in acceleration of the vehicle or motor, when the load conditions of the electric onboard network permit it.

Moreover, the capacitor recharge can also be commanded only when the capacitor voltage is less than a predetermined set point threshold in (8) permitting guaranteeing the nominal performances of the set of functions/devices at the time of restarting or the first start up.

The controlled switches K1 and K3 must be capable to pass currents of the order of 700 A or more (starter current), this during a period on the order of 0.5 seconds as shown in FIG. 1. So-called Power MOS technology switches, for example, can be suitable.

The control unit for controlling the switches K1, K3 and by preference the switch K2 must also be capable of course to handle the switching according to information on the operating state of the starter alternator, but by preference also outside information such as the speed of the vehicle or the motor, voltage (load level) of the capacitor and/or the battery and/or the on board network, compared to reference levels.

Due to the presence of diode 10, we note that the capacitor can only discharge itself toward the battery, in other words the current circulates properly always in the same direction. Advantageously, the internal supply unit is designed to recharge the capacitor by an average current of the order of 40 A, during a period of the order of 10 sec, this for a capacitor of 300 F for example, constituted at least by one UCAP of 2.5 Volts. Even if the internal supply unit is properly a DC/DC converter, it is not dimensioned to feed the onboard network in a continuous fashion, and constitutes in fact a "microconverter" of very small footprint and therefore low mass.

The capacitance of the capacitor as well as its maximum voltage may be adjusted according to the performance constraints: deterioration of the battery, start up power, or constraints of one or several functions/devices supplied requiring a higher voltage in the start up phase. In the deceleration phase of the vehicle, a part of the kinetic energy can serve to recharge the capacitor through the alternator.

Figure 3:
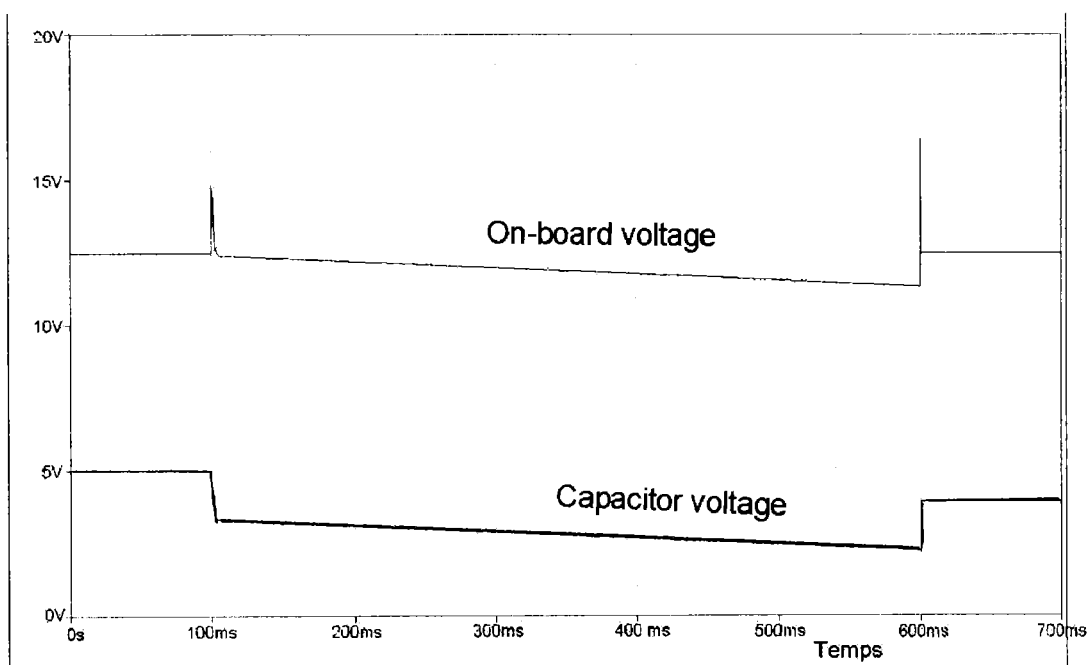
FIG. 3 illustrates the voltage variation of the onboard voltage network, and the capacitor at the time of restarting an electric circuit in conformity with FIG. 2.

In FIG. 3, voltage variation is again represented for the onboard network at the time of a start up, analogous to FIG. 1, but this time with a circuit equipped with the voltage maintenance device according to the invention. We note the formation of a slight voltage peak linked to the closing and opening of the switches K1 and K3 but practically instantaneous, so that they do not normally produce an operating disruption of the different network consumers of electrical energy adapted to such peaks. A very slight deterioration of the onboard network voltage otherwise occurs as the start up phase develops, to reach the order of 1 Volt at the end of the period, but there again, this is normally of an order compatible with a nominal operation of the consumers.

It should be noted that if the starter alternator load is not constant during the start up or restarting phase of the engine, significant voltage variation can occur that can be minimized (clipped) by a regulation of the switch K3.

FIG. 3 also shows the voltage of the capacitor, which makes it appear that a start up constitutes a load loss only equivalent to a drop of the order of 1 Volt. As this voltage variation is much lower than the battery voltage, the recharging of the capacitor is a lot less constraining than if the capacitor was recharged via a shunting in parallel on the battery.

The voltage maintenance device according to the invention also permits compensating for the deterioration of the battery performance in cold weather (the performances of the capacitor is not essentially affected by negative temperatures). It is also especially advantageous with motors whose capacity exceeds 1.6 L for example, for which a significant power is necessary at the time of the start up and restarts.

The invention claimed is:

1. An electric circuit for an automotive vehicle including a grounding line;
   an onboard network with a battery connected to the network and connected to the grounding line by a first branch including a first switch and by a second branch including a second switch;
   an alternator connected to the battery;
   electrical consumer devices connected to the onboard network and to the grounding line; and
   a voltage maintenance device including:
      a bridge connecting a point of the first branch between the battery and the first switch to a point of the second branch between the second switch and the ground line, the bridge including a third switch, and
      a capacitor connected to the bridge at one point between the third switch and the second branch and an internal supply device only permitting the passage of the current in the second branch during recharging of the capacitor.

2. The electric circuit according to claim 1, wherein the alternator comprises a starter alternator including a generator and a starter.

3. The electric circuit according to claim 1, wherein the first branch connects a negative pole of the battery to the ground line.

4. The electric circuit according to claim 1 wherein the internal supply device includes a diode and an inductance coil.

5. The electric circuit according to claim 4 wherein the capacitor is of the supercapacitor type.

6. The electric circuit according to claim 4 wherein the capacitor is formed by several capacitors mounted in series.

7. The electric circuit according to claim 2 including a control unit for the first, second and third switches, the control unit controlling the switches according to the operating mode of the starter alternator.

8. The electric circuit according to claim 7, wherein the control unit also handles at least one piece of external information comprising at least one of a vehicle speed, a charge level of the capacitor, a charge level of the battery and a load level of the onboard network.

9. The electric circuit according to claim 1 wherein the third switch is regulated by clipping voltage variations within the onboard network at the time of one of a start up or a restarting phase of an engine of the vehicle.

* * * * *